United States Patent
Kanno et al.

(10) Patent No.: US 10,363,919 B2
(45) Date of Patent: Jul. 30, 2019

(54) CONTROL APPARATUS FOR HYBRID VEHICLE

(71) Applicant: Toyota Jidosha Kabushiki Kaisha, Toyota-shi, Aichi-ken (JP)

(72) Inventors: Yoshihito Kanno, Numazu (JP); Gohki Kinoshita, Isehara (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/843,277

(22) Filed: Dec. 15, 2017

(65) Prior Publication Data
US 2018/0170352 A1 Jun. 21, 2018

(30) Foreign Application Priority Data
Dec. 19, 2016 (JP) .................. 2016-245626

(51) Int. Cl.
*B60W 20/13* (2016.01)
*B60K 6/445* (2007.10)
(Continued)

(52) U.S. Cl.
CPC ............ *B60W 20/13* (2016.01); *B60K 6/365* (2013.01); *B60K 6/445* (2013.01); *B60W 10/08* (2013.01); *B60W 10/10* (2013.01); *B60W 10/115* (2013.01); *B60W 20/19* (2016.01); *B60W 20/30* (2013.01); *B60W 50/082* (2013.01); *B60W 2510/242* (2013.01); *B60W 2510/244* (2013.01); *B60W 2710/08* (2013.01); *B60W 2710/086* (2013.01); *B60W 2710/10* (2013.01); *B60W 2710/1005* (2013.01); *Y02T 10/623* (2013.01);
(Continued)

(58) Field of Classification Search
USPC ............................................... 701/22
See application file for complete search history.

(56) References Cited

U.S. PATENT DOCUMENTS

2012/0035792 A1* 2/2012 Dolpp .................. B60K 6/48
701/22
2012/0265389 A1* 10/2012 Bissontz .............. B60K 6/48
701/22
(Continued)

FOREIGN PATENT DOCUMENTS

JP 2005-319924 A 11/2005
JP 2010-116120 A 5/2010
(Continued)

*Primary Examiner* — Tyler D Paige
(74) *Attorney, Agent, or Firm* — Dinsmore & Shohl LLP

(57) ABSTRACT

A control apparatus for the hybrid vehicle is provided with: a first switcher configured to switch between a HV running mode in which the internal combustion engine is operated for the hybrid vehicle to run, and an EV running mode in which the internal combustion engine is stopped and the power of the power source is used for the hybrid vehicle to run; a second switcher configured to switch between a first mode and a second mode in which an acceleration performance is emphasized more than in the first mode; and a controller programmed to control the transmission in such a manner that the transmission stage in a particular state in which the EV running mode and the second mode are selected is reduced in comparison with the transmission stage when the hybrid vehicle is not in the particular state.

5 Claims, 11 Drawing Sheets

(51) Int. Cl.
*B60W 10/10* (2012.01)
*B60W 10/08* (2006.01)
*B60K 6/365* (2007.10)
*B60W 50/08* (2012.01)
*B60W 10/115* (2012.01)
*B60W 20/30* (2016.01)
*B60W 20/19* (2016.01)

(52) U.S. Cl.
CPC ........ *Y02T 10/6239* (2013.01); *Y02T 10/6243* (2013.01); *Y02T 10/7077* (2013.01); *Y02T 10/7275* (2013.01); *Y10S 903/93* (2013.01)

(56) References Cited

U.S. PATENT DOCUMENTS

| | | | | |
|---|---|---|---|---|
| 2013/0221928 | A1* | 8/2013 | Kelty | B60L 11/187 320/134 |
| 2014/0194246 | A1* | 7/2014 | Ueda | B60K 6/442 477/5 |
| 2015/0127203 | A1* | 5/2015 | Kashiba | B60W 10/24 701/22 |
| 2015/0283996 | A1* | 10/2015 | Wang | B60K 6/547 477/3 |
| 2015/0322872 | A1* | 11/2015 | Matsubara | B60K 6/445 701/22 |
| 2016/0059845 | A1* | 3/2016 | Nefcy | B60W 20/30 477/115 |

FOREIGN PATENT DOCUMENTS

| | | |
|---|---|---|
| JP | 2010-149748 A | 7/2010 |
| JP | 2011-189889 A | 9/2011 |
| JP | 2012-091563 A | 5/2012 |
| JP | 2012-240485 A | 12/2012 |

* cited by examiner

CONTROL APPARATUS FOR HYBRID VEHICLE

CROSS-REFERENCE TO RELATED APPLICATIONS

This application is based upon and claims the benefit of priority of the prior Japanese Patent Application No. 2018-245626, filed on Dec. 19, 2016, the entire contents of which are incorporated herein by reference.

BACKGROUND

1. Field

Embodiments of the present disclosure relate to a control apparatus for a hybrid vehicle, wherein the control apparatus is configured to control the hybrid vehicle, which includes an internal combustion engine and an electric motor.

2. Description of the Related Art

For this type of apparatus, there is known a technology/technique for selecting a transmission stage of a transmission in view of switching from an EV running mode to a HV running mode. For example, Japanese Patent Application Laid Open No. 2010-149748 (Patent Literature 1) discloses a technology technique for selecting the transmission stage in accordance with an accelerator opening degree in switching from the EV running mode to the HV running mode.

On the other hand, there is also known an apparatus configured to switch shift patterns (or speed change patterns) in accordance with a running performance desired by a driver of a vehicle. For example, Japanese Patent Application Laid Open No. 2012-091563 (Patent Literature 2) discloses a technology/technique for selecting a shift map on which the shift pattern is downshifted, in selecting a sport mode. Japanese Patent Application Laid Open No. 2005-319924 (Patent Literature 3) discloses an apparatus configured to select a power running mode in which a power performance is emphasized, by a manual operation of a switch.

In switching from the EV running mode to the HV running mode, a gear shift (or a speed change), which is mainly a downshift, is performed by the transmission. In this gear shift, a difference in the number of revolutions between before and after the shifting may cause an energy loss. A large energy loss may reduce an energy that can be used as a driving force of a vehicle, which makes it difficult to output a large driving force. Thus, in a situation in which the driver requires a high acceleration performance or in similar situations, the driving force that satisfies the acceleration requirement may not be immediately outputted, which is technically problematic.

In the technology/technique described, in the Patent Literature 1, the transmission stage is set in accordance with the accelerator opening degree. At a time point at which the accelerator opening degree is changed, i.e. at a time point at which the driver requires acceleration, the transmission stage is not switched, and thus, the large driving force may not be immediately outputted.

SUMMARY

The above is one example of problems to be solved by embodiments of the present disclosure. It is an object of embodiments of the present disclosure to provide a control apparatus for a hybrid vehicle, wherein the control apparatus is configured to suppress an insufficient driving force in switching from the EV running mode to the HV running mode.

The above object of embodiments of the present disclosure can be achieved by a control, apparatus fox a hybrid vehicle wherein the hybrid vehicle includes a power source including an internal combustion engine and an electric motor, and a transmission having a plurality of transmission stages provided on a power transmission path through which power of the power source is transmitted to an output shaft, the control apparatus comprising: a first switcher configured to switch between a HV running mode in which the internal combustion engine is operated for the hybrid vehicle to run, and an EV running mode in which the internal combustion engine is stopped and the power of the power source is used for the hybrid vehicle to run; a second switcher configured to switch between a first mode and a second mode in which an acceleration performance is emphasized more than in the first mode: and a controller programmed to control the transmission in such a manner that the transmission stage in a particular state in which the EV running mode and the second mode are selected is reduced in comparison with the transmission stage when the hybrid vehicle is not in the particular state.

According to the control apparatus for the hybrid vehicle in embodiments of the present disclosure, the transmission is controlled in such a manner that the transmission stage in the particular state in which the EV running mode and the second mode are selected is reduced in comparison with the transmission stage when the hybrid vehicle is not in the particular state. This makes it possible to reduce an energy loss caused by a gear shift (or a speed change) in switching from the EV running mode to the HV running mode. In other words, it is possible to increase energy efficiency in switching between the running modes.

Here, in particular, the second mode is a mode in which the acceleration performance is emphasized, and it is thus required to quickly output a relatively large driving force. Therefore, a large energy loss in switching between the running modes may reduce an energy that can be used for a driving force of the hybrid vehicle, which makes it difficult to output a sufficient driving force. In other words, there is a possibility that an appropriate running performance cannot be maintained as the second mode.

In embodiments of the present disclosure, however, due to the control for the transmission stage in the particular state, it is possible to reduce the energy loss in switching from the EV running mode to the HV running mode. As a result, it is possible to avoid that the energy that can be used for the driving force, of the hybrid vehicle is reduced. It is also possible to output a sufficient driving force even in switching from the EV running mode to the HV running mode.

In one aspect of the control apparatus for the hybrid vehicle according to embodiments of the present disclosure, the particular state requires that an output limit value of a battery which is an electric power source of the electric motor, is less than or equal to a predetermined value, in addition to the selection of the EV running mode and the second mode.

According to this aspect, the selection of the EV running mode and the second mode is not enough to determine that the hybrid vehicle is in the particular state. It is not until the output limit value of the battery which is the electric power source of the electric motor, is less than or equal to the predetermined value that the hybrid vehicle is determined to be in the particular state. If the output limit value of the battery is relatively large, i.e. if the output limit value is not limited much, the power that can be outputted from the electric motor is also large, which hardly causes an insufficient driving force. On the other hand, if the output limit value of the battery is relatively small, i.e. if the output limit value is considerably limited, the power that can be outputted from the electric motor is also small, which easily causes an insufficient driving force. Therefore, by setting the particular state as the state in which the output limit value of the battery is less than or equal to the predetermined value, it is possible to prevent that the transmission stage is controlled to be reduced even when the driving force is sufficient.

In another aspect of the control apparatus for the hybrid vehicle according to embodiments of the present disclosure, the controller is programmed, to control the transmission in such a manner that the transmission stage in the particular stage is further reduced in comparison with the transmission stage when the hybrid vehicle is not in the particular state, at a lower output limit value of a battery, which is an electric power source of the electric motor.

As described above, the driving force that can be outputted as an entire system is further reduced at a lower output limit value of the battery which easily results in an insufficient driving force. It is therefore possible to avoid an insufficient driving force by further reducing the transmission stage, at a lower output limit value of the battery.

In another aspect of the control apparatus for the hybrid vehicle according to embodiments of the present disclosure, the electric motor includes a first electric motor coupled with the internal combustion engine via a planetary gear mechanism, and a second electric motor coupled between the planetary gear mechanism and the transmission, and the first electric motor is configured to perform regenerative power generation in switching from the EV running mode to the HV running mode.

In such a configuration, the transmission stage is reduced in the particular state, by which it is possible to increase an amount of regenerative power generation by the first electric motor in switching from the EV running mode to the HV running mode (in other words, immediately after the start of the internal combustion engine). It is thus possible to further increase the energy efficiency of the hybrid vehicle.

The nature, utility and further features of this disclosure will be more clearly apparent from the following detailed description with reference to embodiments of the disclosure when read in conjunction with the accompanying drawings briefly described below.

DETAILED DESCRIPTION

Hereinafter; a control apparatus for a hybrid vehicle according to an embodiment of the present disclosure will be explained.
<Entire Configuration of Hybrid Vehicle>

Figure 1:
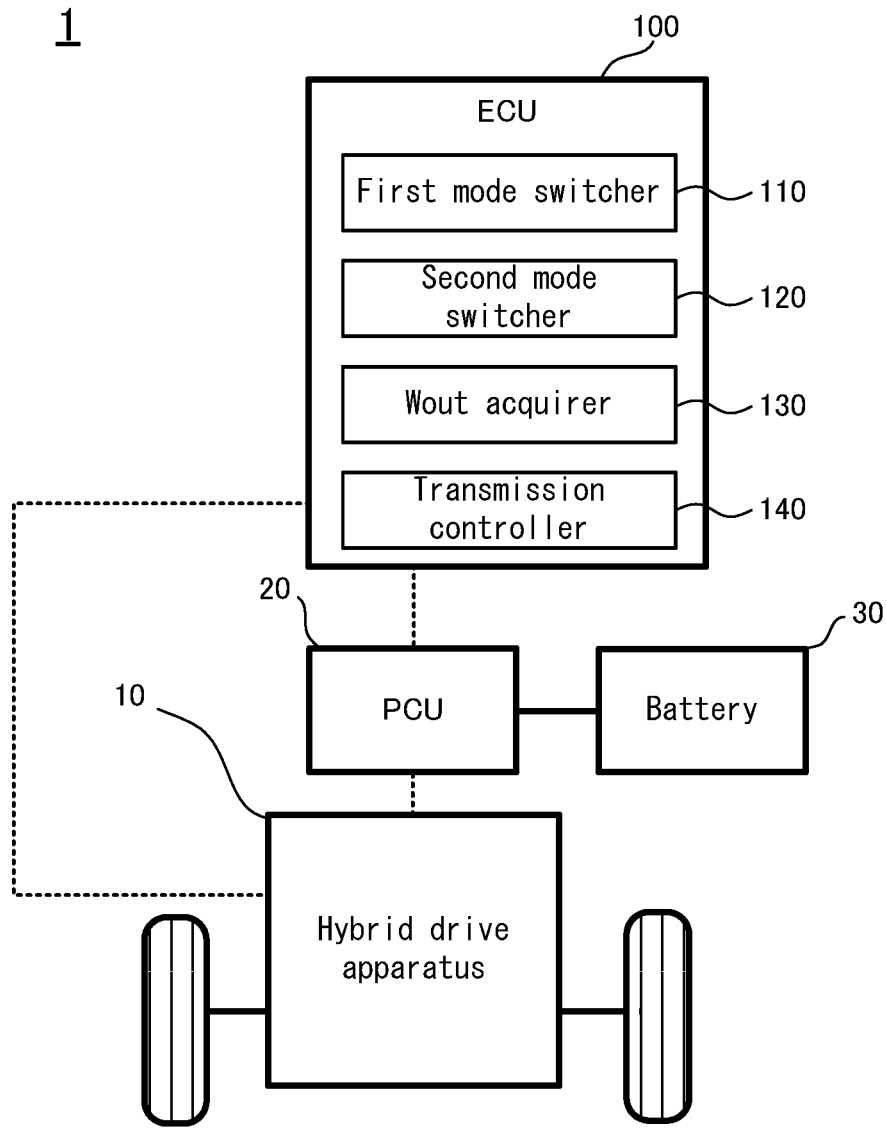
FIG. 1 is a schematic block diagram illustrating an entire configuration of a hybrid vehicle according to an embodiment.

Firstly, with reference to FIG. 1, a configuration of a hybrid vehicle 1 according to the embodiment will be explained. FIG. 1 is a schematic block diagram illustrating an entire configuration of the hybrid vehicle according to the embodiment.

As illustrated in FIG. 1, the hybrid vehicle 1 according to the embodiment is provided with an electronic control unit (ECU) 100, a hybrid drive apparatus 10, a power control unit (PCU) 20, and a battery 30.

The ECU 100 is one specific example of the "control apparatus for the hybrid vehicle". The ECU 100 is an electronic control unit, which is provided with a central processing unit (CPU), a read only memory (ROM), a random access memory (RAM), and the like, and which is configured to control the operation of each of parts of the hybrid vehicle 1. The ECU 100 is configured to perform various controls in the hybrid vehicle 1, for example, in accordance with a control program stored in the ROM or the like. A specific configuration of the ECU 100 will be detailed later.

The hybrid drive apparatus 10 is a power train of the hybrid vehicle 1, and is provided with a power source for running, a power transmission mechanism, and the like. The hybrid drive apparatus 10 is electrically connected to the ECU 100, and is configured in such a manner that the operation thereof is controlled by the ECU 100. A specific configuration of the hybrid drive apparatus 10 will be detailed later.

The PCU 20 is a power control unit configured to control electric power input/output between the battery 80 and motor generators MG1 and MG2 described later. The PCU 20 may include: a system main relay (SMR) configured to block or cut off electrical connection between the battery 30 and an electric power load; a boost converter configured to boost an output voltage of the battery 30 to a boost command voltage that is suitable for the driving of the motor generators MG1 and MG2; and an inverter configured to convert direct current (DC) power that is extracted from the battery 30, to alternating current (AC) power, and supply it to the motor generators MG1 and MG2, and configured to convert AC power that is generated by the motor generators MG1 and MG2, to DC power, and supply it to the battery 30; and the like, all of which are not specifically illustrated in FIG. 1. The PCU 20 is electrically connected to the ECU 100, and is configured in such a manner that the operation thereof is controlled by the ECU 100.

The battery 30 is a secondary battery unit, which may function as an electric power supply associated with electric power for power running of the motor generators MG1 and MG2, or which is configured to store therein electric power obtained fey regeneration of the motor generators MG1 and MG2. The battery 30 is configured in such a manner that a plurality of unit battery cells, such as e.g. lithium ion battery cells, are connected in series. For the battery 30, for example, an output limit value Wout is set in order to suppress deterioration or the like.

<Configuration of Hybrid Drive Apparatus>

Figure 2:
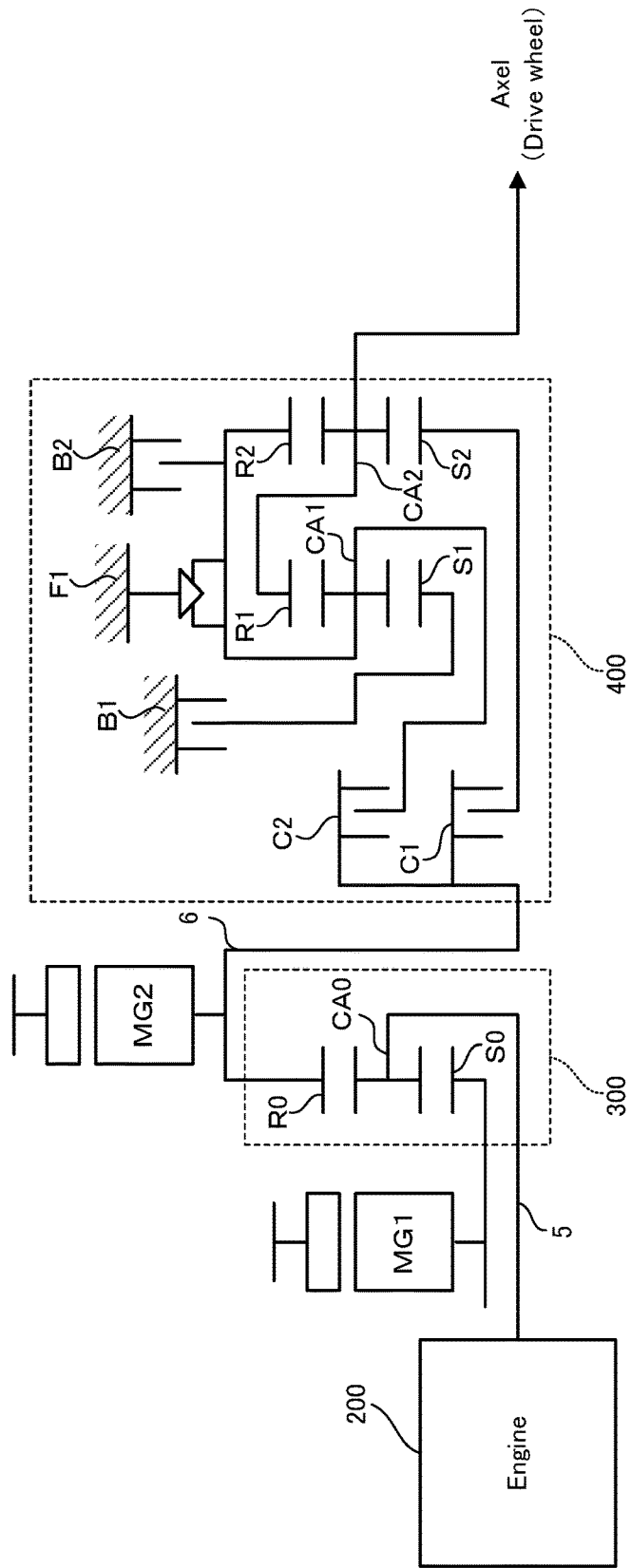
FIG. 2 is a schematic diagram illustrating a configuration of a hybrid drive apparatus according to the embodiment.
Figure 3:
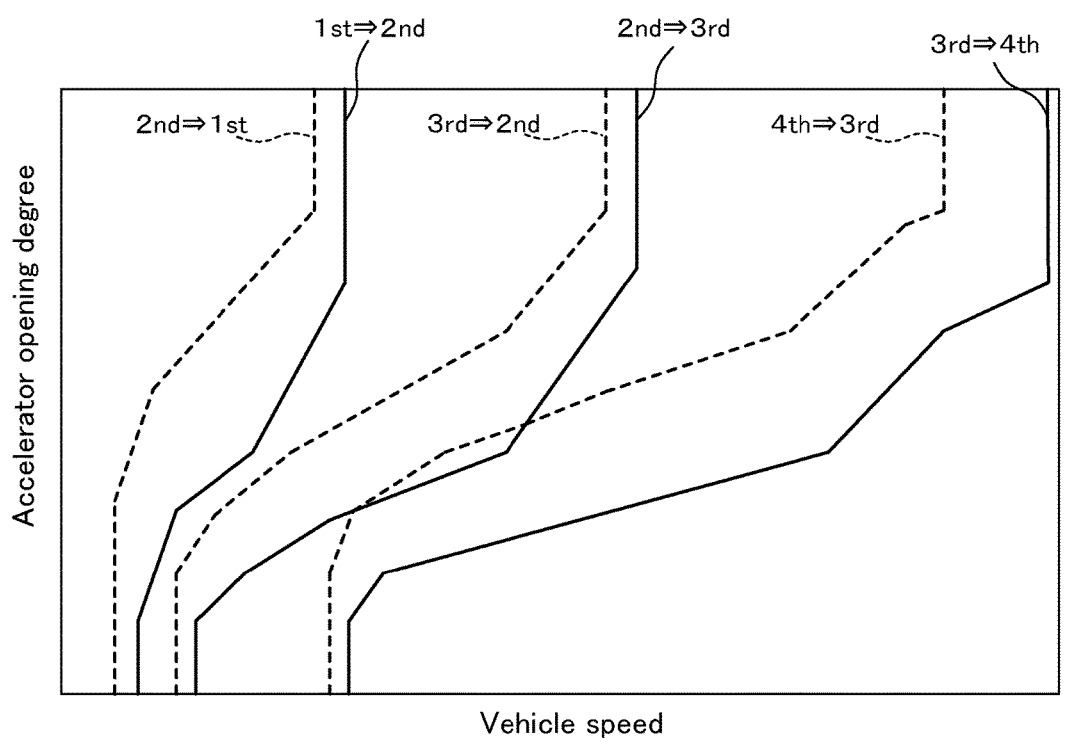
FIG. 3 is a map illustrating gear shift lines of a transmitter of the hybrid vehicle according to the embodiment.

Next, with reference to FIG. 2 and FIG. 3, a configuration of the hybrid drive apparatus 10 according to the embodiment will be explained. FIG. 2 is a schematic diagram illustrating the configuration of the hybrid drive apparatus 10 according to the embodiment. FIG. 3 is a map illustrating gear shift lines of a transmission 400 of the hybrid drive apparatus 10 according to the embodiment.

As illustrated in FIG. 2, the hybrid drive apparatus 10 according to the embodiment is provided with an engine 200, the motor generator MG1, and the motor generator MG2, as the power source for the running of the hybrid vehicle 1.

The engine 200 is one specific example of the "internal combustion engine". The engine 200 is a gasoline engine, which may function as a main power source of the hybrid vehicle 1.

Each of the motor generators MG1 and MG2 is one example of the "electric motor". Each of the motor generators MG1 and MG2 is an electric motor generator, which may have a power running function for converting electrical energy to kinetic energy and a regeneration function for converting kinetic energy to electrical energy. Each of the motor generators MG1 and MG2 is configured as an electric motor generator that is provided with: a rotor(s) having a plurality of permanent magnets on an outer circumferential surfaced and a stator around which a three-phase coil for terming a rotating magnetic field is wound. The motor generators MG1 and MG2, however, may have another configuration.

The engine 200 and the motor generators MG1 and MG2 are coupled with each other via a planetary gear mechanism 300 of a single pinion type. The planetary gear mechanism 300 may have: a sun gear S0, which is an external tooth gear; a ring gear R0, winch is an internal tooth gear placed coaxially with the sun gear S0; and a carrier CA0 configured to hold pinions, which engage with the sun gear S0 and the ring gear R0, in a rotatable and revolvable manner.

An engine output shaft 5, which is an output shaft of the engine 200, is coupled with the carrier CA0 of the planetary gear mechanism 300, and the engine output shaft 5 is configured to rotate integrally with the carrier CA0. Thus, an engine torque outputted by the engine 200 may be transmitted to the carrier CA0. The motor generator MG1 is coupled with the sun gear S0 of the planetary gear mechanism 300. The motor generator MG2 is coupled with a drive shaft 6, which is coupled with the ring gear R0 of the planetary gear mechanism 300. A torque outputted from the engine 200 and the motor generators MG1 and MG2 may be outputted via the planetary gear mechanism 300 and the drive shaft 6.

The drive shaft 6 is coupled with the transmission 400 configured to change a gear ratio of the hybrid vehicle 1. The transmission 400 is provided with two planetary gear mechanisms, which are specifically a planetary gear mechanism provided with a sun gear S1, a ring gear R1, and a carrier CA1, and a planetary gear mechanism provided with a sun gear S2, a ring gear R2, and a carrier CA2; a first clutch C1; a second clutch C2i a one-way clutch F1; a first brake B1; and a second brake B2.

The two planetary gear mechanisms are coupled with each other by coupling the carrier CA1 of one of the two planetary gear mechanisms and the ring gear R2 of the other planetary gear mechanism. Moreover, the ring gear R1 of one of the two planetary gear mechanisms and the carrier CA2 of the other planetary gear mechanism are coupled with each other.

The first clutch C1 is configured to change a power transmission state between the drive shaft 6 and the sun gear S2. The second clutch C2 is configured to change a power transmission state between the drive shaft 6 and the carrier CA1.

The one-way clutch F1 is configured to transmit power only in a predetermined direction between the carrier CA1 and the ring gear R2.

The first brake B1 is configured to stop the rotation of the sun gear S1, The second brake B2 is configured to stop the rotation of the carrier CA1 and the ring gear R2.

A torque transmitted via the transmission 400 may be outputted to an axle side via the carrier CA2. The configuration of the transmission 400 described above is merely one example. A transmission 400 in a different form may be used as a mechanism for changing the gear ratio of the hybrid vehicle 1.

As illustrated in FIG. 3, the transmission 400 is basically controlled to change a transmission stage, which is in other words, a transmission ratio or a gear shift ratio, in accordance with the gear shift lines set in advance. Specifically, a change in the gear ratio according to the gear shift line is realized when an operating point of the hybrid vehicle 1 changes across a gear shift line.

<Configuration of ECU>

Next, back in FIG. 1, a specific configuration of the ECU 100 according to the embodiment will be explained.

As illustrated in FIG. 1, the ECU 100 according to the embodiment is provided with a first mode switcher 110, a second mode switcher 120, a Wout acquirer 180, and a transmission controller 140, as processing blocks logically realized therein, or processing circuits physical realized therein.

The first mode switcher 110 is one specific example of the "first switcher", and is configured, to switch between a HV running mode in which the engine 200 is operated for the hybrid vehicle to run, and an EV running mode in which the engine 200 is stopped and the power of the motor generators MG1 and MG2 is used for the hybrid vehicle to run. The first mode switcher 110 is configured to perform an operation of switching between the HV running mode and the EV running mode, for example, in accordance with a driving force required for the hybrid vehicle 1.

The second mode switcher 120 is one specific example of the "second switcher", and is configured to switch between a normal mode and a power mode in which an acceleration performance is emphasized more than in the normal mode. The normal mode is one specific example of the "first mode", and the power mode is one specific example of the "second mode". The switching between the normal mode and the power ode is realized, for example, by changing a control condition of the hybrid drive apparatus 10. The second mode switcher 120 is configured to perform an operation of switching between the normal mode and the power mode, for example, on the basis of a switch operation by an occupant of the hybrid vehicle 1 or similar operations. Alternatively the second mode switcher 120 may automatically select the power mode if a past history of longitudinal or lateral acceleration in the hybrid vehicle 1 continues to be greater than a predetermined value.

The Wout acquirer 130 is configured to obtain Wout, which is an output limit value of the battery 30. Wout is a value that varies depending on a running state of the hybrid vehicle 1 and a state of the battery 30. The Wout acquirer 180 is configured to obtain Wout, for example, with a predetermined period, or in particular timing. Information regarding the value of Wout obtained by the Wout acquirer 180 may be outputted to the transmission controller 140.

The transmission controller 140 is one specific example of the "controller", and is programmed or configured to control each of parts of the transmission 400, thereby realizing transmission control, i.e. control of changing the transmission stage. In particular, the transmission controller 140 according to the embodiment is programmed to perform transmission stage change control for performing a gear shift to a transmission stage that is different from the normal case under a particular condition. The transmission stage change control will be explained in detail below.

<Transmission Stage Change Control>

Figure 4:
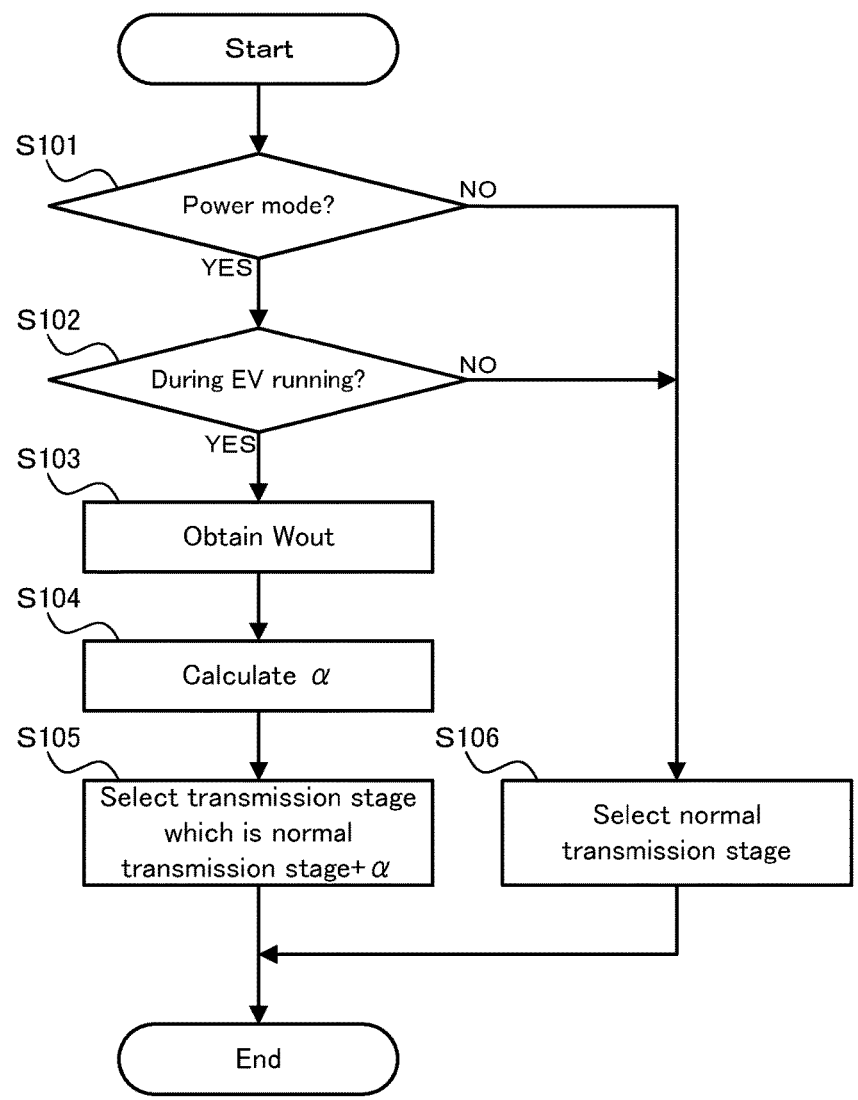
FIG. 4 is a flowchart Illustrating a flow of transmission stage change control performed by a control apparatus for the hybrid vehicle according to the embodiment.
Figure 5:
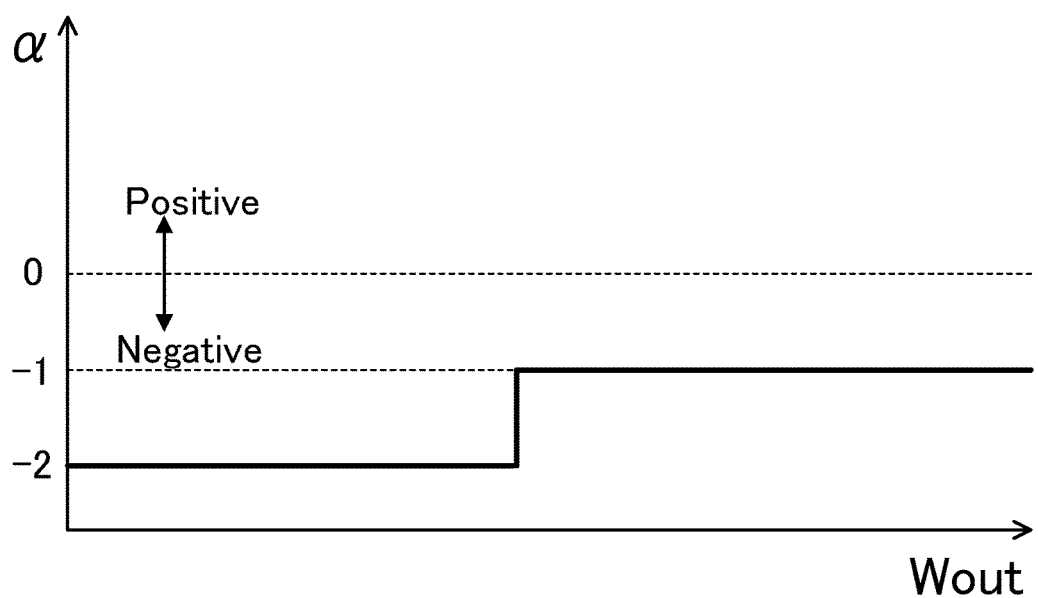
FIG. 5 is a graph illustrating one example of a relation between Wout and α.

Next, with reference to FIG. 4 and FIG. 5, the transmission stage change control performed by the control apparatus tor the hybrid vehicle according to the embodiment, i.e. the ECU 100, will be explained in detail FIG. 4 is a flowchart illustrating a flow of the transmission stage change control performed by the control apparatus for the hybrid vehicle according to the embodiment, FIG. 5 is a graph illustrating one example of a relation between Wout and α.

As illustrated in FIG. 4, in operation of the control apparatus for the hybrid vehicle according to the embodiment, the transmission controller 140 determines whether or not the power mode is selected by the second mode switcher (step S101). If the power mode is selected (the step S101: YES), the transmission controller 140 determines whether or not the EV running mode is selected by the first mode switcher 110 (step S102).

If the EV running mode is selected by the first mode switcher 110 (the step S102: YES), the transmission controller 140 determines that the hybrid vehicle 1 is in a particular state, and performs a process after a step S103. On the other hand, if the power mode is not selected by the second mode switcher 120 (the step S101: NO), or if the EV running mode is not selected by the first mode switcher 110 (the step S102: NO), then, the transmission controller 140 selects a normal transmission stage to control the transmission 400 (step S106). Specifically the transmission controller 140 selects a transmission stage according to the shift map illustrated in FIG. 3.

If the hybrid vehicle 1 is in the particular state, i.e. in the EV running mode and the power mode, the Wout acquirer 130 obtains a current value of Wout, and outputs information about the obtained value to the transmission controller 140 (step S103). The transmission controller 140 calculates a value α for changing the transmission stage (step S104).

Then, the transmission controller 140 selects a transmission stage obtained by adding α to the normal transmission stage, i.e. the transmission, stage according to the shift map illustrated in FIG. 3, to control, the transmission 400 (step S105). The transmission stage in the particular state is not greater than the normal transmission stage because a is calculated to be less than or equal to zero. In other words, α is a value that is calculated as a value indicating to what extent the transmission stage in the particular state is reduced in comparison with the normal transmission stage.

As illustrated in FIG. 5, if the obtained Wout is relatively small, α is calculated as "−2". On the other hand, if the obtained Wout is relatively large, α is calculated as "−1". As described above, as the obtained Wout is smaller, α is also calculated as a smaller value. Therefore, the transmission stage in the particular state is controlled, to be smaller at a smaller Wout. An effect of the embodiment described later is more remarkably exhibited as the transmission stage is smaller; however, there is also a risk of busy shift, i.e. frequent change in the transmission stage. Thus, appropriate a is calculated in accordance with the value of Wout, which makes it possible to prevent a new detrimental effect.

When the normal transmission stage, i.e. the transmission stage before adding α, is $1^{st}$, even if α is calculated as "−1" or "−2", the transmission stage cannot be reduced beyond that. When the normal transmission stage is $2^{nd}$, even if α is calculated to be greater than or equal to "2", the transmission stage can be reduced only to $1^{st}$, i.e. only by one stage. In this case, the following control may be performed; namely, exceptionally not changing the transmission stage, or changing to the lowest transmission stage, i.e. $1^{st}$.

A series of steps associated with the transmission stage change control is now completed. Typically, the process is started again after a lapse of a predetermined period from the end of a series of the steps. In other words, a series of steps associated with the transmission stage change control is repeated with a predetermined period.

First Modified Example

Figure 6:
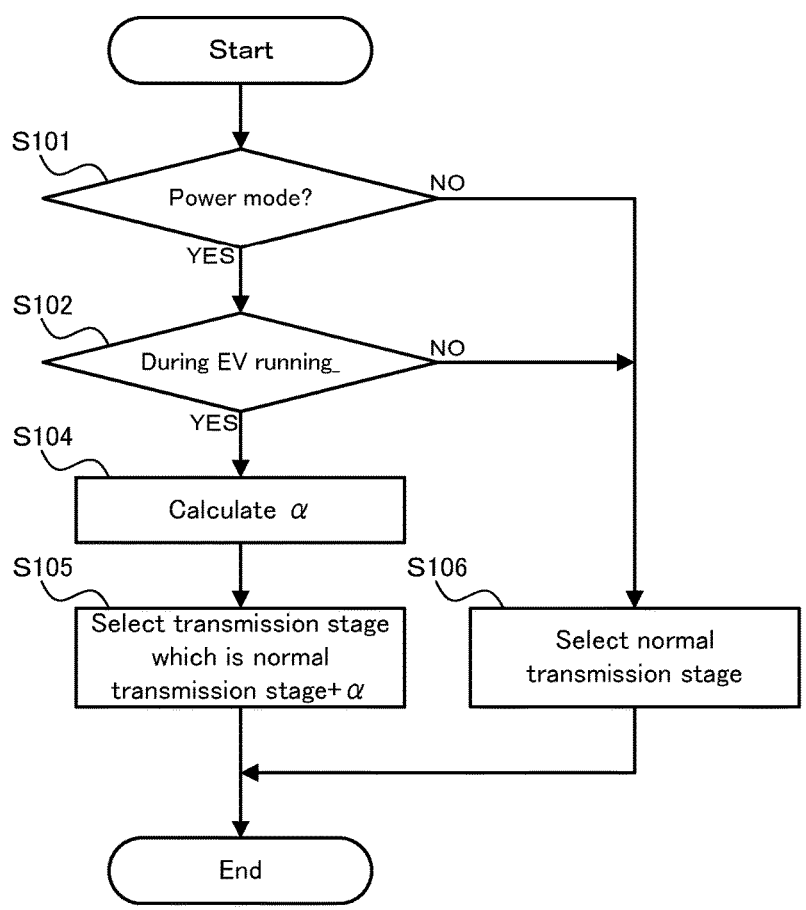
FIG. 6 is a flowchart illustrating a flow of transmission stage change control performed by a control apparatus for a hybrid vehicle according to a first modified example.

Now, with reference to FIG. 6, transmission stage change control according to a first modified example will be explained in detail. FIG. 6 is a flowchart illustrating a flow of the transmission stage change control performed by a control apparatus for a hybrid vehicle according to the first modified example. FIG. 6 carries the same reference numerals for the same steps as the steps illustrated in FIG. 4.

As illustrated in FIG. 6, in operation of the control apparatus for the hybrid vehicle according to the first modified example, if the hybrid vehicle 1 is in the particular state, i.e. in the EV running mode and the power mode (the step S102: YES), the step S103 is omitted, and the step S104 is performed. In other words, the control of obtaining the current value of Wout and outputting the information about the obtained value to the transmission controller 140 is not performed. At a time point at which the hybrid vehicle 1 is determined to be in the particular state, the transmission controller 140 calculates the value α for changing the transmission stage (the step S104).

In the first modified example, the value α for changing the transmission stage is determined to be a predetermined value stored in advance (e.g. "−1" or "2"). Even if α is determined in this manner when the hybrid vehicle 1 is in the particular state, the transmission stage that is lower than the normal transmission stage is selected. Thus, the technical effect described later is appropriately obtained.

If the first modified example is applied, it is not necessary to perform the process of obtaining the value of Wout and the process of calculating a on the basis of Wout. It is therefore possible to simplify an apparatus configuration and a process.

Second Modified Example

Next, with reference to FIG. 7, a method of calculating a according to a second modified example will be explained.

Figure 7:
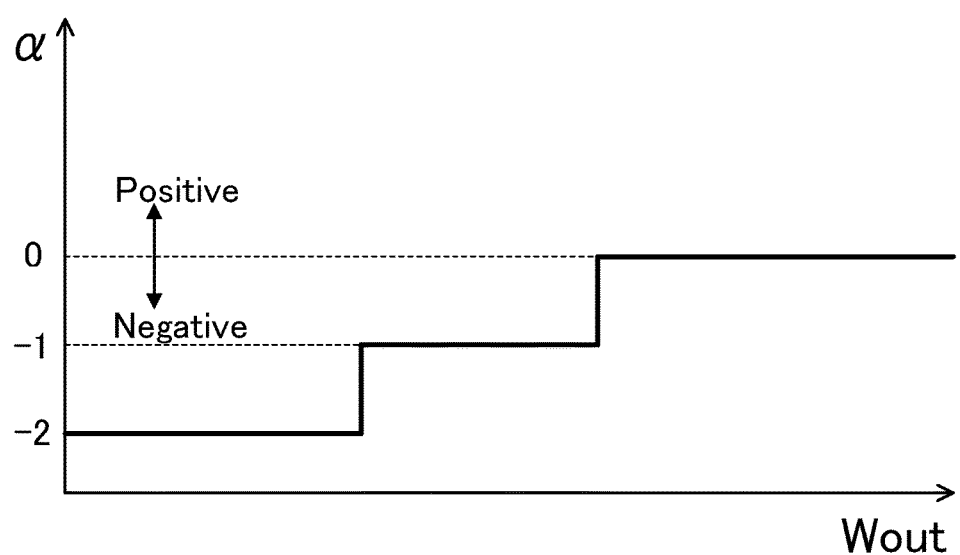
FIG. 7 is a graph illustrating one example of the relation between Wout and α according to the second modified example.

FIG. 7 is a graph illustrating one example of the relation between Wout and α according to the second modified example.

As illustrated in FIG. 7, in the second modified example, as in the case illustrated in FIG. 5, as the obtained. Wout is smaller, α is also calculated as a smaller value. In the second modified example, however, if the obtained Wout is sufficiently large, for example, if Wout is large enough to avoid an insufficient driving force due to outputs from the motor generators MG1 and MG2, then, α is calculated to be zero. When α is zero, the transmission stage is not changed even if α is added. As a result, the normal transmission stage is selected. In other words, when the method of calculating a according to the second modified example is used, if Wout is sufficiently large, the process of reducing the transmission stage is not performed. This is the same meaning as that the particular state according to the second modified example includes such a condition that Wout is less than or equal to a predetermined value, in addition to the already-explained condition of the particular stage, i.e. the EV running mode and the power mode.

As described above, according to the second modified example in which a may be calculated to be zero, it is possible to prevent that the control of reducing the transmission stage is unnecessarily performed.

Effect of Embodiment

Figure 8:
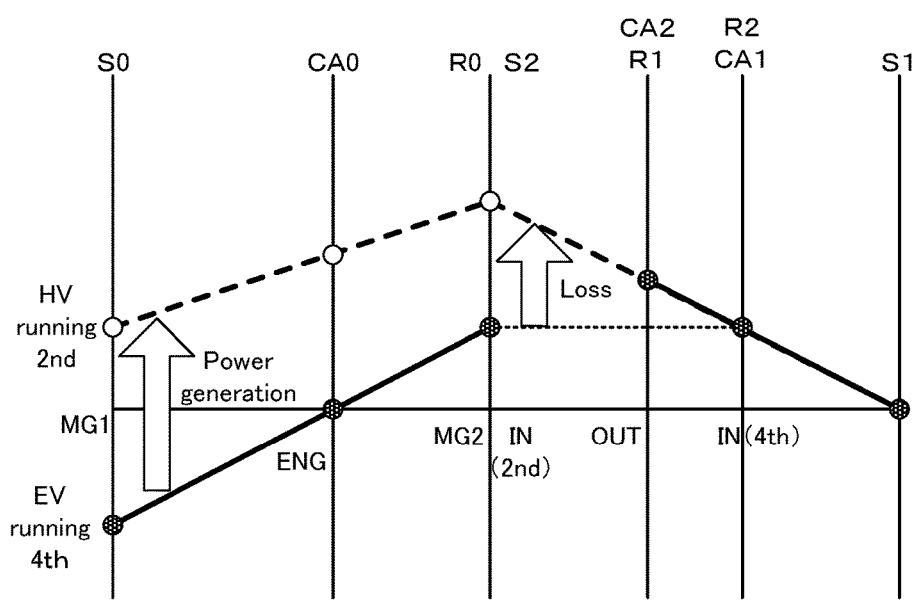
FIG. 8 is a collinear chart illustrating a shift operation when a running mode is changed, according to a comparative example.
Figure 9:
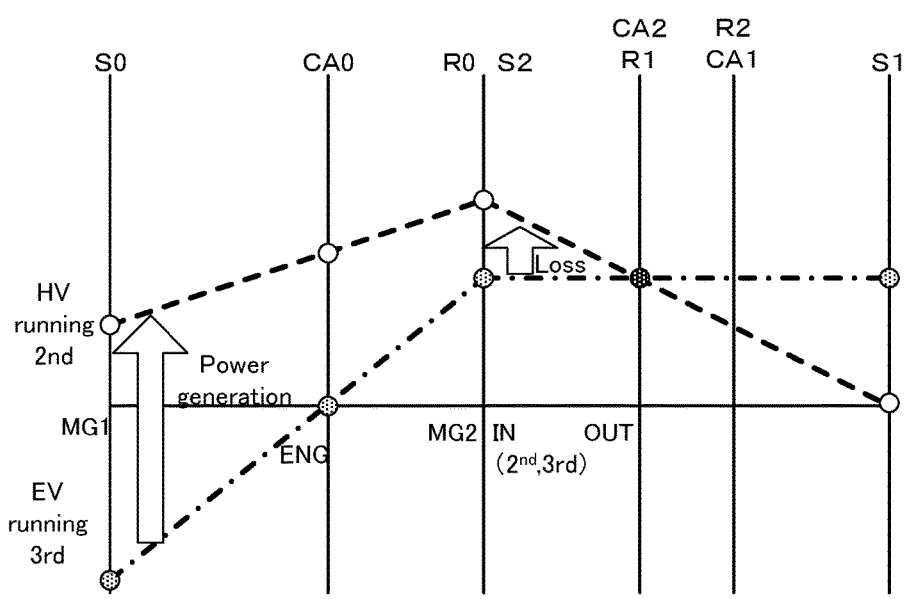
FIG. 9 is a collinear chart illustrating a shift operation when the running mode is changed, according to the embodiment.
Figure 10:
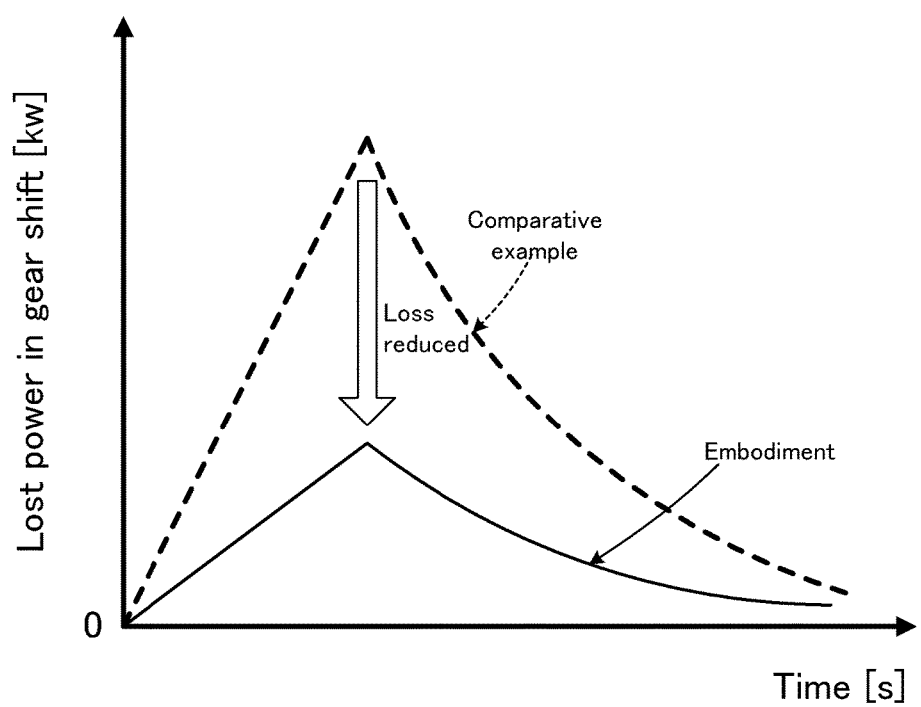
FIG. 10 is a graph illustrating lost power in a gear shift or a speed change.
Figure 11:
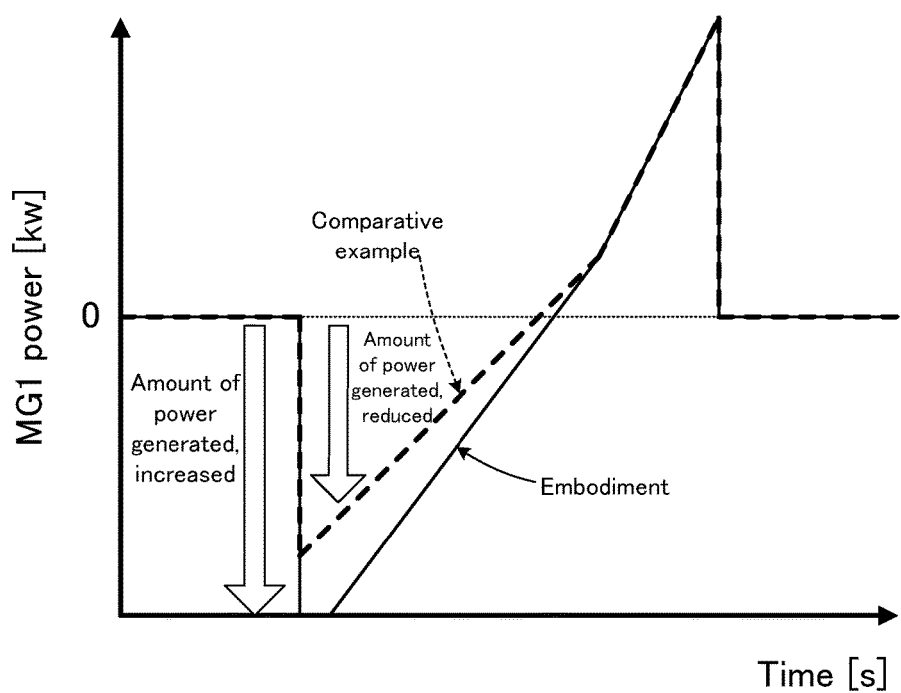
FIG. 11 is a graph illustrating an amount of power generated by a motor generator MG1 in the gear shift.

Next, with reference to FIG. 8 to FIG. 11, the effect obtained by the transmission stage change control will be specifically explained. FIG. 8 is a collinear chart illustrating a shift operation when the running mode is changed, according to a comparative example. FIG. 9 is a collinear chart illustrating a shift operation when the running mode is changed, according to the embodiment. FIG. 10 is a graph illustrating lost power in a gear shift or a speed change. FIG. 11 is a graph illustrating an amount of power generated by the motor generator MG1 in the gear shift.

Hereinafter, a beneficial technical effect obtained by the embodiment will be explained by comparing the embodiment in which the transmission stage change control is performed, with the comparison example in which the transmission stage change control is not performed.

As illustrated in FIG. 8, in the comparative example, in switching from the EV running mode to the HV running mode, the transmission stage is changed from $4^{th}$ to $2^{nd}$. In switching from the EV running mode to the HV running mode, an energy loss is generated due to a difference in the number of revolutions that occurs in the drive shaft 6 before and after the gear shift. The energy loss is greater in a larger number of revolutions. On the other hand, on the motor generator MG1, regenerative power generation is performed by using power when the engine 200 is started.

As illustrated in FIG. 9, in the embodiment, in switching from the EV running mode to the HV running mode, the transmission stage is changed from $3^{rd}$ to $2^{nd}$. In other words, in comparison with the comparative example, the transmission stage in the EV running is reduced by one stage by the transmission stage change control. As a result, the energy loss caused by the gear shift, which can be generated in switching from the EV running mode to the HV running mode, is reduced. Moreover, an amount of power generated by the motor generator MG1 is increased.

As illustrated in FIG. 10, the lost power in the gear shift (which is, in other words, the energy loss) is lower in the embodiment than in the comparative example. In other words, the energy loss generated in switching from the EV running mode to the HV running mode is reduced by performing the transmission stage change control. In the embodiment, it is thus possible to increase energy efficiency in the hybrid vehicle 1.

As illustrated in FIG. 11, MG1 power in the gear shift changes in a negative direction, i.e. to a power generation side, more significantly in the embodiment than in the comparative example. In other words, the amount of power generated in switching from the EV running mode to the HV running mode is increased by performing the transmission stage change control. In the embodiment, it is thus possible to increase the energy efficiency in the hybrid vehicle 1.

When the power mode is selected, it is desired to output a larger driving force more quickly than when the normal mode is selected. If, however, the energy efficiency is low in switching from the EV running mode to the HV running mode, there is a possibility that a sufficient driving force cannot be outputted quickly. Such a situation may significantly reduce the satisfaction of an occupant that selects the power mode.

In contrast, on the control apparatus for the hybrid vehicle according to the embodiment, the energy efficiency in switching from the EV running mode to the HV running mode can be increased by the transmission stage change control. It is thus possible to avoid an insufficient driving force, and it is possible to keep running without reducing the satisfaction of the occupant that selects the power mode.

In the transmission stage change control, the transmission stage is reduced, by which fuel consumption or a performance regarding noise or vibration may be reduced from the normal case. This, however, does not cause any significant problem because the occupant that selects the power mode is considered to be patient with those detrimental effects.

As explained above, according to tire control apparatus for the hybrid vehicle in the embodiment, it is possible to avoid an insufficient driving force that can be generated in switching between the running modes, by increasing the energy efficiency in switching from the EV running mode to the HV running mode.

Aspects of the disclosure may be embodied in other specific forms without departing from the spirit or essential characteristics thereof. The present embodiments and examples are therefore to be considered in all respects as illustrative and not restrictive, the scope of the claimed subject matter being indicated by the appended claims rather than by the foregoing description and all changes which come within the meaning and range of equivalency of the claims are therefore intended to be embraced therein.

What is claimed is:

1. A control apparatus for a hybrid vehicle wherein the hybrid vehicle includes a power source including an internal combustion engine and an electric motor, and a transmission having a plurality of transmission stages provided on a power transmission path through which power of the power source is transmitted to an output shaft, said control apparatus comprising an electronic control unit configured to:
    switch between a HV running mode in which the internal combustion engine is operated for the hybrid vehicle to run, and an EV running mode in which the internal combustion engine is stopped and the power of the power source is used for the hybrid vehicle to run;
    switch between a normal mode and a power mode in which an acceleration performance is emphasized more than in the normal mode; and
    control the transmission in such a manner that a transmission stage in a particular state in which the EV running mode and the power mode are selected is lower than a transmission stage when the hybrid vehicle is not in the particular state.

2. The control apparatus for the hybrid vehicle according to claim 1, wherein the particular state requires that an output limit value of a battery, which is an electric power source of the electric motor, is less than or equal to a predetermined value, in addition to the selection of the EV running mode and the power mode.

3. The control apparatus for the hybrid vehicle according to claim 2, wherein the electronic control unit is further configured to control the transmission in such a manner that the transmission stage in the particular state is further lower than the transmission stage when the hybrid vehicle is not in the particular state, at a lower output limit value of a battery, which is an electric power source of the electric motor.

4. The control apparatus for the hybrid vehicle according to claim 1, wherein the electronic control unit is further configured to control the transmission in such a manner that the transmission stage in the particular state is further lower than the transmission stage when the hybrid vehicle is not in the particular state, at a lower output limit value of a battery, which is an electric power source of the electric motor.

5. The control apparatus for the hybrid vehicle according to claim 1, wherein the electric motor includes a first electric motor coupled with the internal combustion engine via a planetary gear mechanism, and a second electric motor coupled between the planetary gear mechanism and the transmission, and the first electric motor is configured to perform regenerative power generation in switching from the EV running mode to the HV running mode.

* * * * *

UNITED STATES PATENT AND TRADEMARK OFFICE
CERTIFICATE OF CORRECTION

Page 1 of 2

PATENT NO. : 10,363,919 B2
APPLICATION NO. : 15/843277
DATED : July 30, 2019
INVENTOR(S) : Yoshihito Kanno and Gohki Kinoshita It is certified that error appears in the above-identified patent and that said Letters Patent is hereby corrected as shown below:

In the Specification

In Column 1, Line 8, delete "Application No. 2018-245626" and insert --Application No. 2016-245626--, therefor.

In Column 1, Line 28, after "technology", insert --/--.

In Column 2, Line 6, after "apparatus", delete "fox" and insert --for--, therefor.

In Column 2, Line 64, after "battery", insert --,--.

In Column 3, Line 16, after "programmed", delete ",".

In Column 3, Line 24, after "battery", insert --,--.

In Column 3, Line 27, after "stage", delete ",".

In Column 4, Line 51, after "battery", delete "80" and insert --30--, therefor.

In Column 5, Line 5, delete "fey" and insert --by--, therefor.

In Column 5, Line 37, delete "surfaced" and insert --surface;--, therefor.

In Column 5, Line 38, delete "terming" and insert --forming--, therefor.

In Column 5, Line 45, delete "winch" and insert --which--, therefor.

In Column 5, Line 64, after "with", insert --:--.

In Column 6, Line 2, after "clutch", delete "C2i" and insert --C2;--, therefor.

Signed and Sealed this
Twenty-fourth Day of September, 2019

Andrei Iancu
*Director of the United States Patent and Trademark Office*

CERTIFICATE OF CORRECTION (continued)
U.S. Pat. No. 10,363,919 B2

In Column 6, Line 29, after "which is", insert --,--.

In Column 6, Line 40, after "Wout acquirer", delete "180" and insert --130--, therefor.

In Column 6, Line 61, delete "ode" and insert --mode--, therefor.

In Column 7, Line 8, delete "180" and insert --130--, therefor.

In Column 7, Line 11, delete "180" and insert --130--, therefor.

In Column 7, Line 26, delete "tor" and insert --for--, therefor.

In Column 7, Line 27, after "detail", insert --.--.

In Column 7, Line 30, after "embodiment", delete "," and insert --.--, therefor.

In Column 7, Line 60, after "transmission", delete ",".

In Column 7, Line 61, after "control", delete ",".

In Column 8, Line 6, after "controlled", delete ",".

In Column 8, Line 11, before "is", delete "a" and insert --α--, therefor.

In Column 8, Line 53, delete ""2"" and insert --"-2"--, therefor.

In Column 8, Line 54, after "manner", insert --,--.

In Column 8, Line 60, after "calculating", delete "a" and insert --α--, therefor.

In Column 8, Line 66, after "calculating", delete "a" and insert --α--, therefor.

In Column 9, Line 5, after "obtained", delete --.--.

In Column 9, Line 14, before "according", delete "a" and insert --α--, therefor.

In Column 9, Line 23, after "which", delete "a" and insert --α--, therefor.

In Column 10, Line 34, delete "tire" and insert --the--, therefor.